US011605370B2

(12) United States Patent
Zhang

(10) Patent No.: US 11,605,370 B2
(45) Date of Patent: Mar. 14, 2023

(54) SYSTEMS AND METHODS FOR PROVIDING AUDIBLE FLIGHT INFORMATION

(71) Applicant: Honeywell International Inc., Charlotte, NC (US)

(72) Inventor: Dongfang Zhang, Beijing (CN)

(73) Assignee: Honeywell International Inc., Charlotte, NC (US)

( * ) Notice: Subject to any disclaimer, the term of this patent is extended or adjusted under 35 U.S.C. 154(b) by 35 days.

(21) Appl. No.: 17/444,944

(22) Filed: Aug. 12, 2021

(65) Prior Publication Data
US 2023/0046264 A1 Feb. 16, 2023

(51) Int. Cl.
*G10L 15/26* (2006.01)
*G10L 15/00* (2013.01)
*G10L 13/047* (2013.01)
*G08G 5/00* (2006.01)
*G06F 40/205* (2020.01)

(52) U.S. Cl.
CPC .......... *G10L 13/047* (2013.01); *G06F 40/205* (2020.01); *G08G 5/0021* (2013.01)

(58) Field of Classification Search
CPC ................................ G10L 15/00; G10L 15/26
See application file for complete search history.

(56) References Cited

U.S. PATENT DOCUMENTS

| 7,415,326 | B2 | 8/2008 | Komer et al. |
| 9,269,347 | B2 | 2/2016 | Latorre-Martinez et al. |
| 9,626,955 | B2 | 4/2017 | Fleizach et al. |
| 9,666,178 | B2 | 5/2017 | Loubiere et al. |
| 10,796,686 | B2 | 10/2020 | Arik et al. |
| 10,878,803 | B2 | 12/2020 | Yuan et al. |
| 2010/0152924 | A1 | 6/2010 | Pandit et al. |
| 2015/0339049 | A1 | 11/2015 | Kasemset et al. |

(Continued)

FOREIGN PATENT DOCUMENTS

| JP | 5697734 B1 * | 4/2015 | |
| KR | 20200051213 A * | 5/2020 | ............. G10L 15/26 |
| WO | WO-2017069324 A1 * | 4/2017 | ............. G02B 27/01 |

OTHER PUBLICATIONS

Sercan Ö. Arik, "Deep Voice: Real-time Neural Text-to-Speech", 2017, Proceedings of the 34th International Conference on Machine Learning, Sydney, Australia, PMLR 70 (10 pages).

(Continued)

*Primary Examiner* — Shreyans A Patel
(74) *Attorney, Agent, or Firm* — Bookoff McAndrews PLLC

(57) ABSTRACT

Disclosed are methods and systems for providing audible flight information to an operator of an aircraft. A method, for example, may include receiving flight information detected by one or more sensors positioned on the aircraft, causing an image to be displayed on a display device, the image including a plurality of text items corresponding to the flight information, receiving a first operator selection indicative of one or more of the text items, parsing the one or more text items to generate a set of intermediate data, synthesizing audio data based on the intermediate data, and causing audible content corresponding to the audio data to be emitted by one or more audio emitting devices, wherein the audible content includes speech corresponding to the flight information.

20 Claims, 8 Drawing Sheets

(56) References Cited

U.S. PATENT DOCUMENTS

2016/0078859 A1     3/2016  Luan et al.
2016/0267901 A1     9/2016  Zhao et al.
2020/0387172 A1*   12/2020  Haskins ................. G01S 19/15

OTHER PUBLICATIONS

Younggun Lee et al., "Voice Imitating Text-to-Speech Neural Networks", Jun. 4, 2018 (8 pages).
Aaron van den Oord et al., "WaveNet: A Generative Model for Raw Audio", Sep. 19, 2016, <https://arxiv.org/abs/1609.03499> (5 pages).
Paul Taylor, "Text-to-Speech Synthesis", University of Cambridge, Print Publication 2009, Published Online Jan. 2011 (627 pages).

* cited by examiner

SYSTEMS AND METHODS FOR PROVIDING AUDIBLE FLIGHT INFORMATION

TECHNICAL FIELD

Various embodiments of the present disclosure relate generally to systems and methods for providing audible information and, more particularly, to systems and methods for providing audible flight information to an operator of an aircraft.

BACKGROUND

Current cockpit systems often rely on pre-recorded audio files for providing audible information to pilots and other aircraft crew. With pre-recorded audio, the information audibly provided to pilots and aircraft crew may necessarily be limited. Frequently, only very high-priority information related to immediate dangers to the aircraft may be provided aurally. Additionally, to the extent pre-recorded audio requires updating over time, spoken audio information may be inconsistent if a single speaker is not available to record all of the audio. Furthermore, pre-recorded audio may be incapable of adequately conveying dynamic information such as flight metrics or navigation instructions.

The present disclosure is directed to overcoming one or more of these above-referenced challenges.

SUMMARY OF THE DISCLOSURE

According to certain aspects of the disclosure, systems and methods for providing audible flight information to an operator of an aircraft are described.

In one example, a method of providing audible flight information to an operator of an aircraft may include: receiving, by one or more processors, flight information detected by one or more sensors positioned on the aircraft; causing, by the one or more processors, an image to be displayed on a display device, the image including a plurality of text items corresponding to the flight information; receiving, by the one or more processors, a first operator selection indicative of one or more of the text items; in response to the first operator selection, parsing, by the one or more processors, the one or more text items to generate a set of intermediate data; synthesizing, by the one or more processors, audio data based on the intermediate data; and causing, by the one or more processors, audible content corresponding to the audio data to be emitted by one or more audio emitting devices, wherein the audible content includes speech corresponding to the flight information.

In another example, a method of providing audible flight information to an operator of an aircraft may include: receiving, by one or more processors, flight information detected by one or more sensors positioned on the aircraft; causing, by the one or more processors, an image to be displayed on a display device, the image including a plurality of text items corresponding to the flight information; parsing, by the one or more processors, the one or more text items to generate a set of intermediate data; synthesizing, by the one or more processors using a first machine learning model, audio data based on the intermediate data; and causing, by the one or more processors, audible content corresponding to the audio data to be emitted by one or more audio emitting devices, wherein the audible content includes speech corresponding to the flight information.

In a further example, a system for providing audible flight information to an operator of an aircraft may include: one or more memories storing instructions and at least one machine learning model trained to associate text with audio; and one or more processors operatively connected to the one or more memories. The one or more processors may be configured to execute the instructions to: receive the flight information detected by the one or more sensors; cause an image to be displayed on a display device, the image including a plurality of text items corresponding to the flight information; receive an operator selection indicative of one or more of the text items; parse, using the at least one machine learning model, the one or more text items to generate a set of intermediate data including sentiment information for each of the one or more text items; synthesize, using the at least one machine learning model, audio data based on the intermediate data; and cause audible content corresponding to the audio data to be emitted by one or more audio emitting devices, wherein the audible content includes speech representative of each of the one or more text items.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to systems and methods for providing audible information and, more particularly, to systems and methods for providing audible flight information to an operator of an aircraft.

Presenting audible information to pilots and other members of a crew on an aircraft may be helpful for relieving eye strain and may also be helpful for providing information when the pilot or other aircraft crew are unable to read text, such as during complex operations. Some cockpit audio systems may use pre-recorded audio files for providing audible information to pilots and other aircraft crew. Information provided using pre-recorded audio, however, may be significantly limited due to cost and resources necessary to create the recordings. In an ordinary aircraft, for example, about 300 pre-recorded audio files may be used, a large proportion of which may be unique to the particular aircraft. Thus, for a fleet of 100 different aircrafts, approximately 10,000 unique audio files may need to be created. Despite the burden of creating and storing the audio files, the audio files may only correspond to the highest priority information related to immediate dangers to an aircraft.

Another limitation of pre-recorded audio may be that the tone and cadence can become inconsistent if more than one speaker is used. Frequently, a catalog of pre-recorded audio must be updated to account for technology upgrades, changing regulations, or the like. If the same speaker is not used for the original audio files and any updated audio files, the pre-recorded audio may be of inconsistent quality. Moreover, each time the pre-recorded audio is updated, related software for storing and playing back the pre-recorded audio may likewise require updating, subjecting aircraft custodians to additional costs.

As avionics systems become more sophisticated, the amount of information pilots and other aircraft crew must monitor during flight may further increase. In situations in which a cockpit is poorly illuminated or the aircraft is in strong turbulence, for example, a pilot or other aircraft crew may not be able to easily read flight information from the display. Existing avionics systems may further be unable to convey important dynamic information such as navigation information to a pilot or other aircraft crew in an audible manner.

Accordingly, a need exists to address the foregoing challenges. In particular, a need exists for improved systems for providing audible information to an operator of an aircraft. Embodiments of this disclosure offer technical solutions to address the foregoing needs, as well as other needs.

While this disclosure describes the systems and methods with reference to aircrafts, it should be appreciated that the present systems and methods may be applicable to other vehicles, including automobiles, ships, heavy machines, or any other vehicle.

Figure 1:
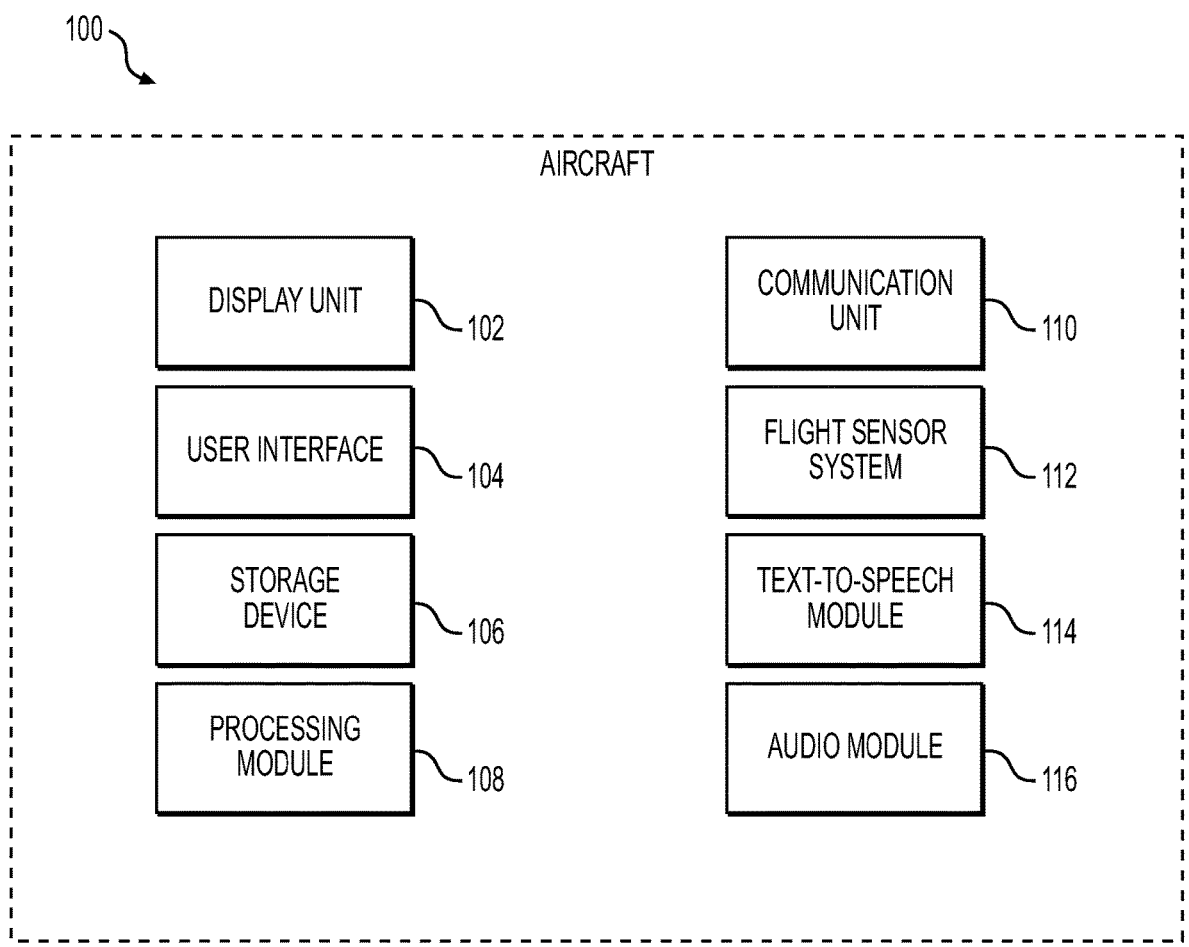
FIG. 1 depicts a functional block diagram of an exemplary aircraft system, according to one or more embodiments.

FIG. 1 depicts a functional block diagram of an exemplary aircraft system that may be used with techniques described herein. Aircraft 100 may include a display unit 102, a user interface 104, a storage device 106, and a processing module 108. Aircraft 100 may further include a communication unit 110, a flight sensor system 112, a text-to-speech module 114, and an audio module 116. As will be described herein, components of aircraft 100 may communicate and/or cooperate to provide audible information to an operator of an aircraft. The foregoing elements of aircraft 100 may be coupled together by a suitable interconnection architecture that accommodates data communication, the transmission of control or command signals, and/or the delivery of operating power within the aircraft 100. It should be understood that FIG. 1 is a simplified representation of aircraft 100 that will be used for purposes of explanation and ease of description, and that FIG. 1 is not intended to limit the scope of the subject matter in any way. In practice, aircraft 100 may include other devices and components for providing additional functions and features, as will be appreciated in the art.

Display unit 102 may be configured to provide textual, graphical, or iconic information to an operator of the aircraft. Display unit 102 may include any one of numerous known displays suitable for rendering textual, graphic, and/or iconic information in a format viewable by the operator. Non-limiting examples of such displays include various cathode ray tube (CRT) displays, and various flat panel displays such as LCD (liquid crystal display) and TFT (thin film transistor) displays. The display unit may additionally be implemented as a panel-mounted display, a HUD (head-up display) projection, or any one of numerous known technologies. The display unit may further be configured as any one of numerous types of aircraft flight deck displays. For example, it may be configured as a primary flight display (PFD), a multi-function display, a horizontal situation indicator, or a vertical situation indicator.

Display unit 102 may include a display screen that is configured to display images including, but not limited to, text, graphics, and iconic information. In some embodiments, display unit 102 may include multiple display screens and in some embodiments, aircraft 100 may include multiple display units 102.

User interface 104 may be suitably configured to receive input from an operator of the aircraft and, in response to the operator input, to supply appropriate command signals to processing module 108. User interface 104 may include any one, or any combination, of various known user interface devices or technologies, including, but not limited to: a cursor control device such as a mouse, a trackball, or joystick; a keyboard; buttons; switches; knobs; levers; or dials. Moreover, user interface 104 may cooperate with display unit 102 to provide a graphical user interface to the operator. For example, an operator may manipulate user interface 104 by moving a cursor symbol rendered on display unit 102, and the operator may use a keyboard to, among other things, input text. The operator may manipulate user interface 104 to view different windows on display unit 102 or operate various instruments of the aircraft 100.

Storage device 106 may be a RAM memory, flash memory, EPROM memory, EEPROM memory, registers, a hard disk, a removable disk, a CD-ROM, any other form of storage medium known in the art, or any combination of the foregoing. Storage device 106 may be coupled to processing module 108 such that processing module 108 can read information from, and write information to, storage device 106. In the alternative, storage device 106 may be integral to processing module 108. As an example, processing module 108 and storage device 106 may reside in an ASIC. In practice, a functional or logical module of the aircraft 100 may be realized using program code that is maintained in storage device 106. For example, display unit 102, processing module 108, communication unit 110, flight sensor system 112, text-to-speech module 114 and audio module 116 may have associated software program components that are stored in storage device 106. Moreover, storage device 106 may be used to store data utilized to support the implementation of text-to-speech conversion and generation of audible information, according to the following description.

Processing module 108 may be implemented or realized with one or more general purpose processors, graphical processing units (GPUs), content addressable memory, digital signal processors, application specific integrated circuits, field programmable gate arrays, any suitable programmable logic devices, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices (e.g., a combination of a digital signal processor and a microprocessor, a plurality of microprocessors, one or more microprocessors in conjunction with a digital signal processor core, or any other such configuration). As described in further detail herein, processing module 108 may perform text-to-speech processes to convert text items representing flight information for output to the operator as audible information. Processing module 108 may further include a graphic display generation computer, such as the Honeywell Advanced Graphics Module. The Advanced Graphics Module may generate images for display by display unit 102.

Communication unit 110 may be configured to support data communication between aircraft 100 and one or more remote systems. For example, communication unit 110 may be configured to enable aircraft 100 to communicate with an air traffic control (ATC) system. Communication unit 110 may include or support a datalink subsystem that can be used to provide ATC data to aircraft 100 and/or to send information from aircraft 100 to an ATC system. Communication unit 110 may also be used to communicate with other aircraft that are near aircraft 100. For example, communication unit 110 may be configured for compatibility with Automatic Dependent Surveillance-Broadcast (ADS-B) technology, with Traffic and Collision Avoidance System (TCAS) technology, and/or with similar technologies.

Flight sensor system 112 may include one or more sensors positioned on aircraft 100. The sensors may collect information about aircraft 100, about environments inside and outside of aircraft 100, and/or about flight of aircraft 100. The sensors may include: pressure sensors; temperature sensors; force sensors; torque sensors; speed sensors; position and displacement sensors; level sensors; proximity sensors; flow sensors; accelerometers; gyroscopes; pitot probes; radar sensors; angle-of-attack (AoA) sensors; altimeter sensors; smoke detection sensors; GPS sensors; or any other sensors known in the art. The sensors may collect information that is transmitted to storage device 106 and/or processing module 108, for example.

Text-to-speech module 114 may include software and/or hardware configured to parse text and synthesize the parsed text as audio data suitable for output as audible content, as described in further detail hereinafter. In some embodiments, text-to-speech module 114 may include one or more processors configured to parse text and synthesize the parsed text as audible speech. In some embodiments, text-to-speech module 114 may include one or more machine learning models configured to parse text and/or one or more machine learning models configured to synthesize the parsed text as audio data. In some embodiments, one or more of the machine learning models may be neural networks. In some embodiments, text-to-speech module 114 may be incorporated in storage device 106 and/or processing module 108.

Audio module 116 may include software and/or hardware configured to output audible content to an operator of aircraft 100. For example, audio module 116 may include an audio driver, a sound card, an audio output, one or more speakers, and/or one or more audio headsets.

Figure 2:
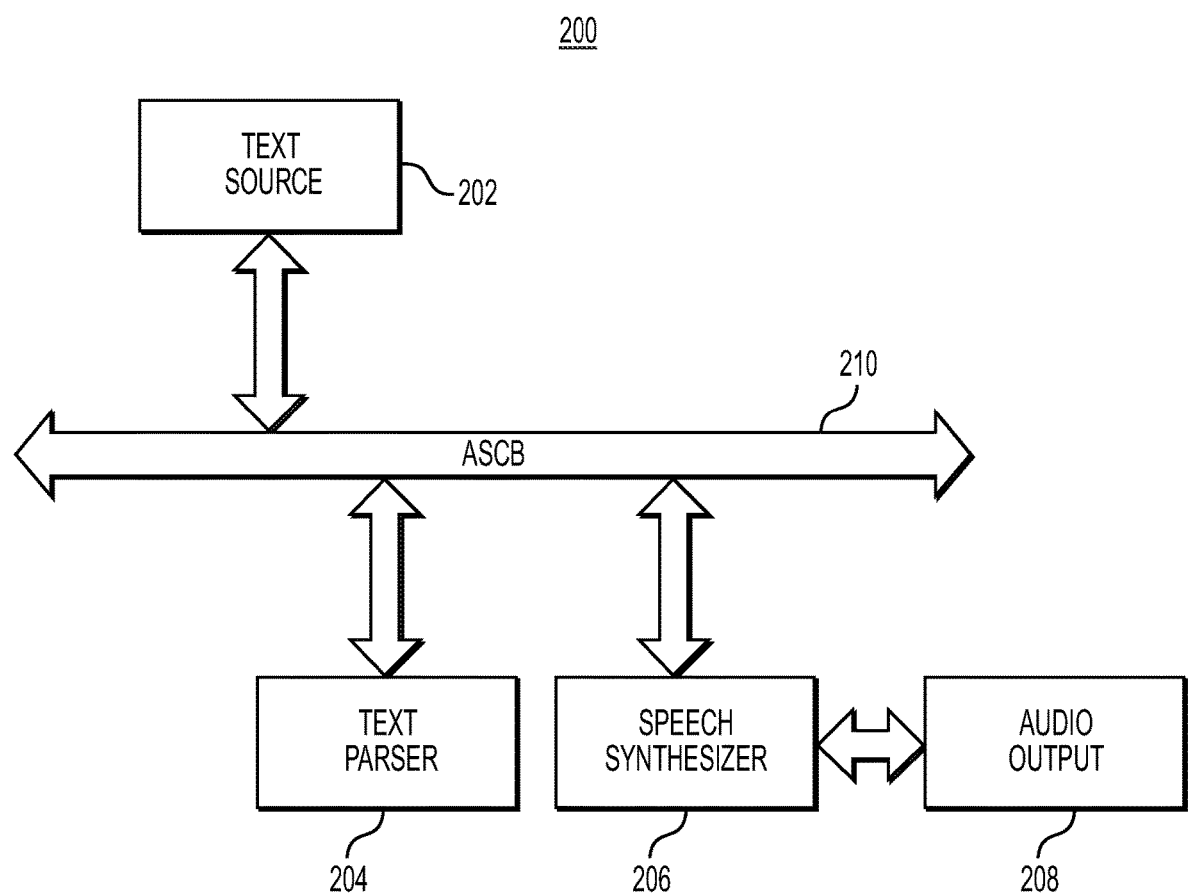
FIG. 2 depicts a functional block diagram of an exemplary text-to-speech system, according to one or more embodiments.

FIG. 2 illustrates a simplified schematic diagram of a system 200 for providing audible information to an operator of aircraft 100, according to one or more embodiments. System 200 may include a text source 202, a text parser 204, a speech synthesizer 206, and an audio output 208. Text source 202, text parser 204, speech synthesizer 206, and/or audio output 208 may be connected by, and communicate via, avionics standard communication bus (ACSB) 210. Text source 202 may include various text items that may be displayed to an operator of aircraft 100 via display unit 102. Text source 202 may be implemented in one or more of storage device 106 and processing module 108. For example, text source 202 may be incorporated in an Advanced Graphics Module of processing module 108. Text parser 204 may and speech synthesizer 206 may also be implemented in one or more of storage device 106 and processing module 108.

In practice, text selected by an operator of aircraft 100 for output as audible content may be transmitted from text source 202 to text parser 204 via ASCB 210. Text parser 204 may parse the selected text to generate a set of intermediate data suitable for speech synthesis. Text parser 204 may parse the text, i.e. generate intermediate data suitable for speech synthesis, according to any suitable technique, including those disclosed in (1) Van den Oord, *Wavenet: A generative model for raw audio*, 2016 and (2) Sercan Ö. Arik, Mike Chrzanowski, *Deep Voice: Real-time Neural Text-to-Speech*, 2017, the entirety of which are incorporated herein by reference. By way of example, text parser 204 may parse the selected text by converting the text to phonemes and identifying characteristics of each phoneme, such as boundaries, duration, and fundamental frequency. In some embodiments, text parser 204 may use one or more machine learning models to parse the selected text. In some embodiments, the one or more machine learning models may include one or more neural networks. In some embodiments, text parser 204 may include a grapheme-to-phoneme dictionary.

The intermediate data may then be transmitted from text parser 204 to speech synthesizer 206 via ASCB 210. Speech synthesizer 206 may then generate audio data based on the intermediate data. The audio data may then be transmitted to audio output 208, where it may be played back as audible content to the operator of aircraft 100. The audible content may include synthesized speech corresponding to the text initially selected by the operator. In some embodiments, the audible content may be subordinate to other types of audio the operator may receive, such as commands from air traffic control, emergency alerts, or the like. Accordingly, the audible content may be automatically paused or stopped to allow such other types of audio to be played back and be heard by the operator.

Figure 3:
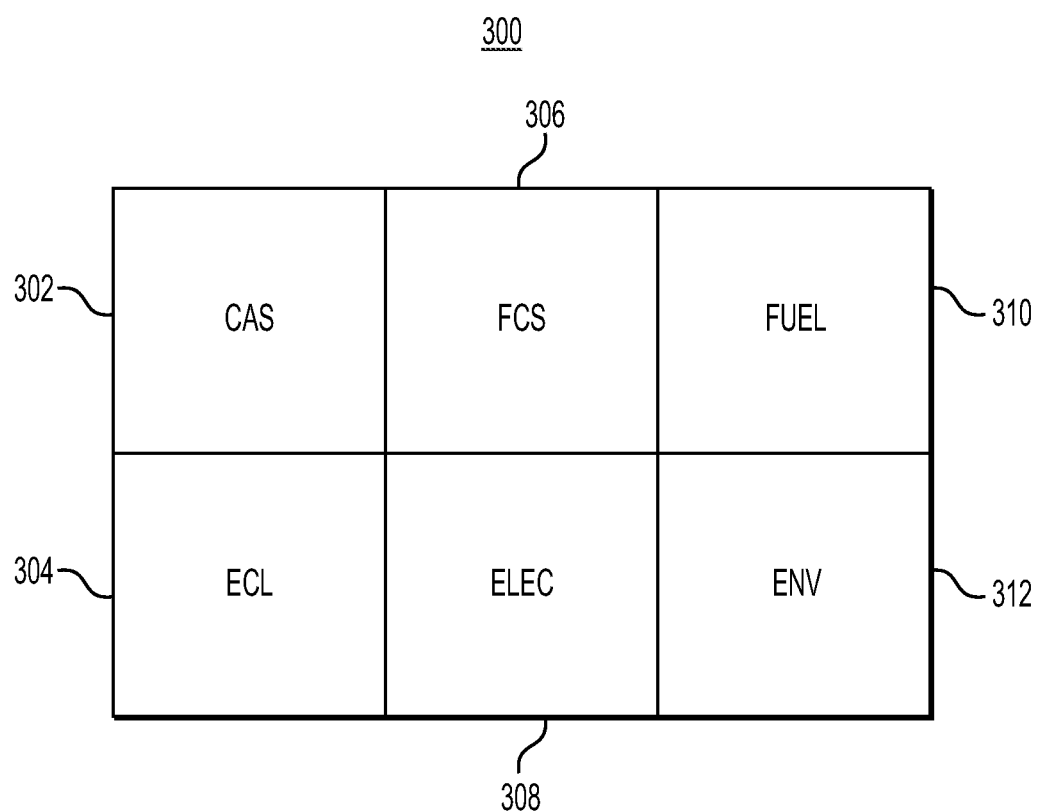
FIG. 3 depicts a schematic diagram of a display unit, according to one or more embodiments.

FIG. 3 depicts a schematic diagram of a display 300 of display unit 102, via which the operator may select text items for playback as audible information. Display 300 may include a collision avoidance system (CAS) window 302, an emitter coupler logic (ECL) window 304, a flight control system (FCS) window 306, an electrical (ELEC) window 308, a fuel window 310, and an environment (ENV) window 312. CAS window 302 may display text and graphical information related to a collision avoidance system of aircraft 100. ECL window 308 may display text and graphical information related to electrical switches or circuits of aircraft 100. FCS window 306 may display text and graphical information related to a flight control system of aircraft 100. ELEC window 308 may display text and graphical information related to an electrical system and/or electrical components of aircraft 100. ENV window 312 may display text and graphical information related to an interior and/or exterior environment of aircraft 100.

In lieu of reading the text displayed by the various windows of display 300, an operator of aircraft 100 may choose to select one or more of the windows such that the text of the one or more windows is played back as audible content. For example, the operator may select a window to be played back as audible content using one or more components of user interface 104, such as a keyboard and/or a mouse. Upon selection of the window, the text displayed by the selected window may be parsed, synthesized as audio data, and output to the operator as audible content.

Figure 4A:
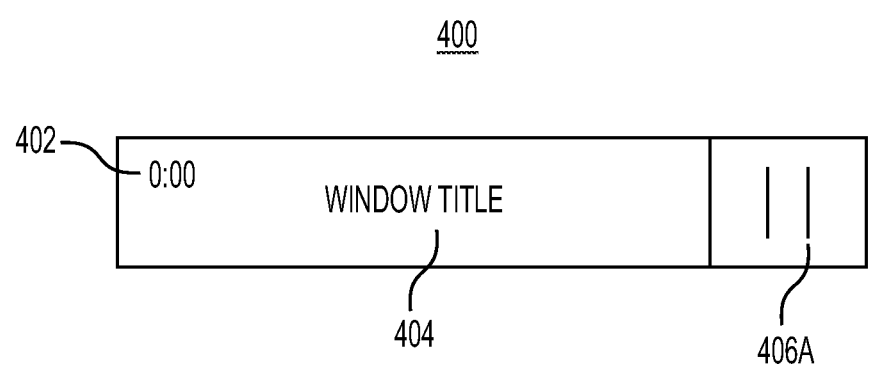
FIG. 4A depicts an exemplary status icon, according to one or more embodiments.
Figure 4B:
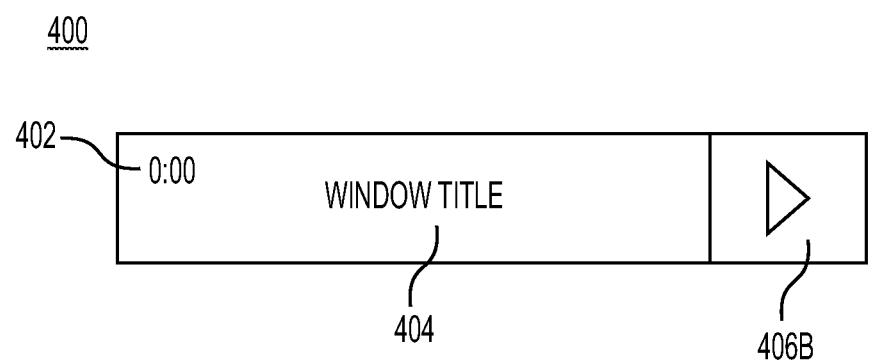
FIG. 4B depicts an exemplary status icon, according to one or more embodiments.

Additionally, upon selection of the window, a status icon 400 as shown in FIGS. 4A and 4B may appear near or within the window. Status icon 400 may be displayed by display unit 102 such that it does not cover other information conveyed by the windows or otherwise. In some embodiments, status icon 400 may be a transparent icon indicative of emission of audible content. As shown in FIG. 4A, status icon 400 may include a playback duration 402, a window title 404, and a pause button 406A that is selectable to pause the audible content when audible content is output to the operator. When the audible content is paused, status icon 400 may include a play button 406B that is selectable to resume or otherwise output the audible content to the operator. For pause and play functionality, the operator may make a selection indicative of pause button 406A and play button 406B respectively. Playback duration 402 may indicate an amount of time audible content has played, or alternatively may indicate an amount of time remaining for the audible content. Window title 404 may indicate a title of a window selected for playback. For example, if the operator selects FCS window 306 for playback, window title 404 may be indicative of FCS window 306.

Figure 5:
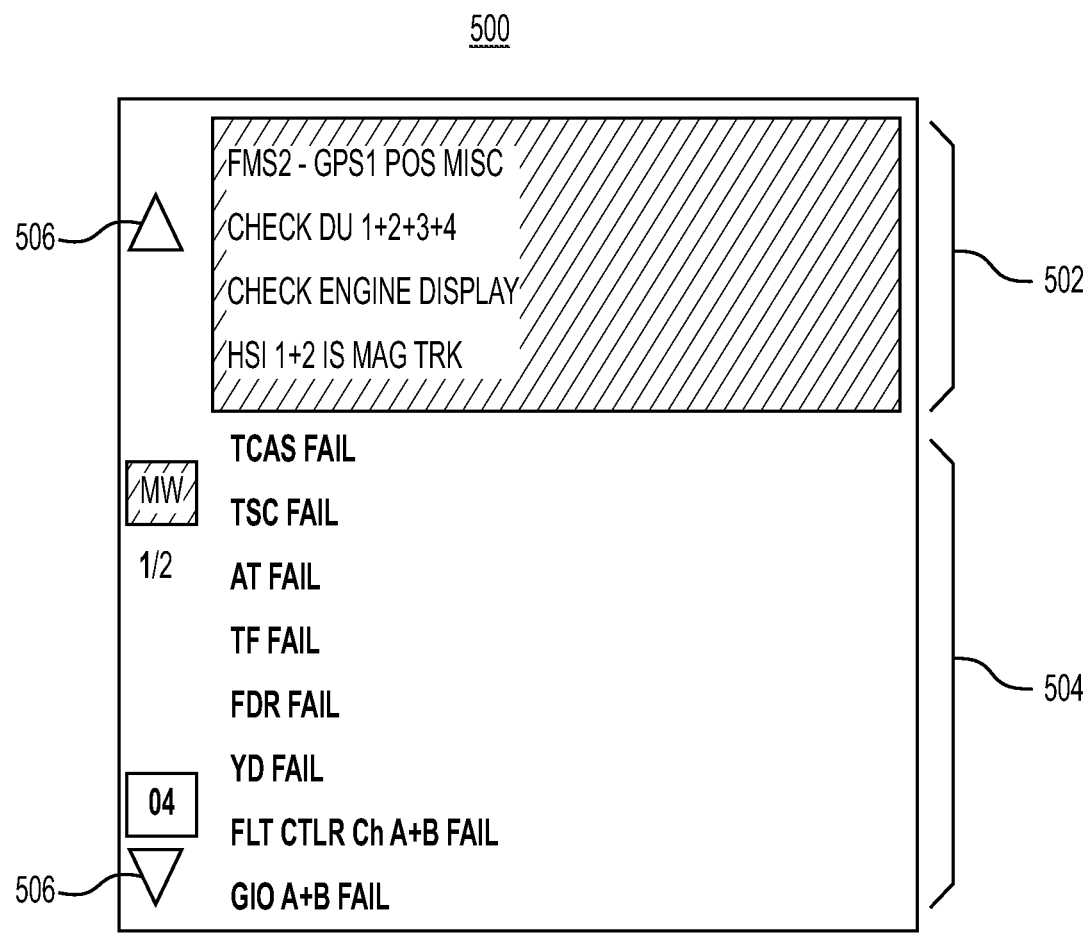
FIG. 5 depicts an exemplary window shown on a display unit, according to one or more embodiments.

FIG. 5 illustrates an exemplary CAS window 500 that may be displayed by display unit 102 and may be selected for audio playback by an operator. CAS window 500 may include a first set of text items 502 and a second set of text items 504 displayed therein. CAS window 500 may further include one or more scroll icons 506 configured to allow an operator to navigate information displayed by CAS window 500. In some embodiments, selection of CAS window 500 by the operator may result in playback of all of the first set of text items 502 and all of the second set of text items 504 as audio content. In some embodiments, the operator may select either the first set of text items 502 or the second set of text items 504 for playback as audio content. In some embodiments, the operator may choose an individual text item or a subset of text items within either or both of the first set of text items 502 and the second set of text items 504 for playback.

The first set of text items 502 and the second set of text items 504 may each have a sentiment associated therewith. For example, as shown in FIG. 5, the first set of text items 502 may be displayed in CAS window 500 with highlighting, which may be intended to draw the operator's visual attention to the first set of text items 504, and which may indicate that the first set of text items are associated with a particularly sentiment. For example, the first set of text items may be associated with a "caution" sentiment, indicating urgency for the operator. Upon playback of the text items of CAS window 500 as audible content, the audible content may include speech with a "caution" sentiment or tone corresponding to the first set of text items 502. The "caution" sentiment may be intended to alert the operator to the urgency of the information conveyed by the first set of text items 502.

The second set of text items 504 may be displayed in CAS window 500 without highlighting, indicating that the second set of text items 504 may be associated with another sentiment. For example, the second set of text items 504 may be associated with an "advisory" sentiment, indicating less urgency than text items associated with a "caution" sentiment. Upon playback of the text items of CAS window 500 as audible content, the audible content may include speech with an "advisory" sentiment corresponding to the second set of text items 504. The "advisory" sentiment may be intended to convey to the operator a relatively lower urgency of the information conveyed by the second set of text items 504.

Figure 6:
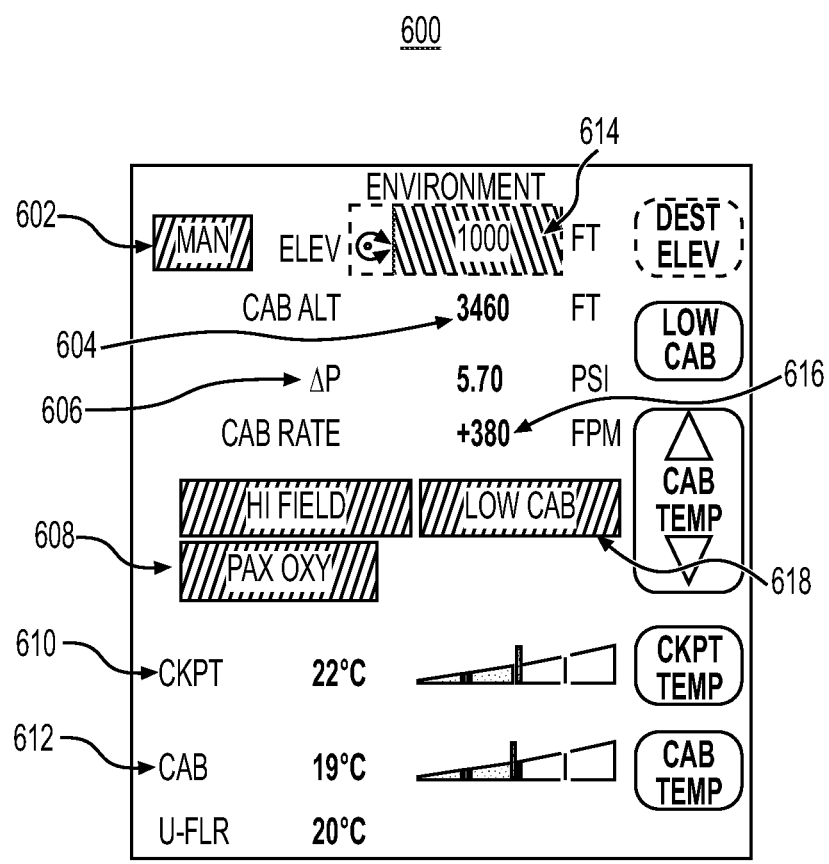
FIG. 6 depicts an exemplary window shown on a display unit, according to one or more embodiments.

FIG. 6 illustrates an exemplary ENV window 600 that may be displayed by display unit 102 and may likewise be selected for audio playback by the operator. ENV window 600 may include a manual low-frequency effects annunciation label 602, a cabin altitude readout 604, a cabin differential pressure 606, a passenger oxygen deploy indication 608, a cockpit temperature control readout 610, a cabin temperature control readout 612, a landing field elevation readout 614, a cabin altitude rate readout 616, and a cabin mode indication label 618. In some embodiments, the operator may select the entirety of ENV window 600 for playback as audible content. In some embodiments, the operator may select one or more of the text items included in ENV window 600 for playback.

In some embodiments, the audible content played back to the operator may include a literal speech recitation of the text in ENV window 600. For example, upon selection of landing field elevation readout 614 for playback, the audible content may include a spoken recitation of "ELEV 1000 FT." Alternatively, in some embodiments, predicate phrases may be added to the text items selected for audio playback where appropriate to make the audible content sound more natural to the operator. For example, upon selecting of landing field elevation readout 614 for playback, the audible content may include a spoken recitation of "the landing field elevation is 1,000 feet."

In some embodiments, the operator may select a plurality of windows such that the text displayed in the respective windows is played in sequence. For example, the operator may select both CAS window 500 and ENV window 600 for playback. In response, audible content corresponding to the text displayed in CAS window 500 may be provided to the operator, followed by audible content corresponding to the text displayed in ENV window 600. In certain situations, the operator may choose to play back more or less than two windows. In some embodiments, the operator may select portions of text displayed in multiple windows for sequential playback.

Figure 7:
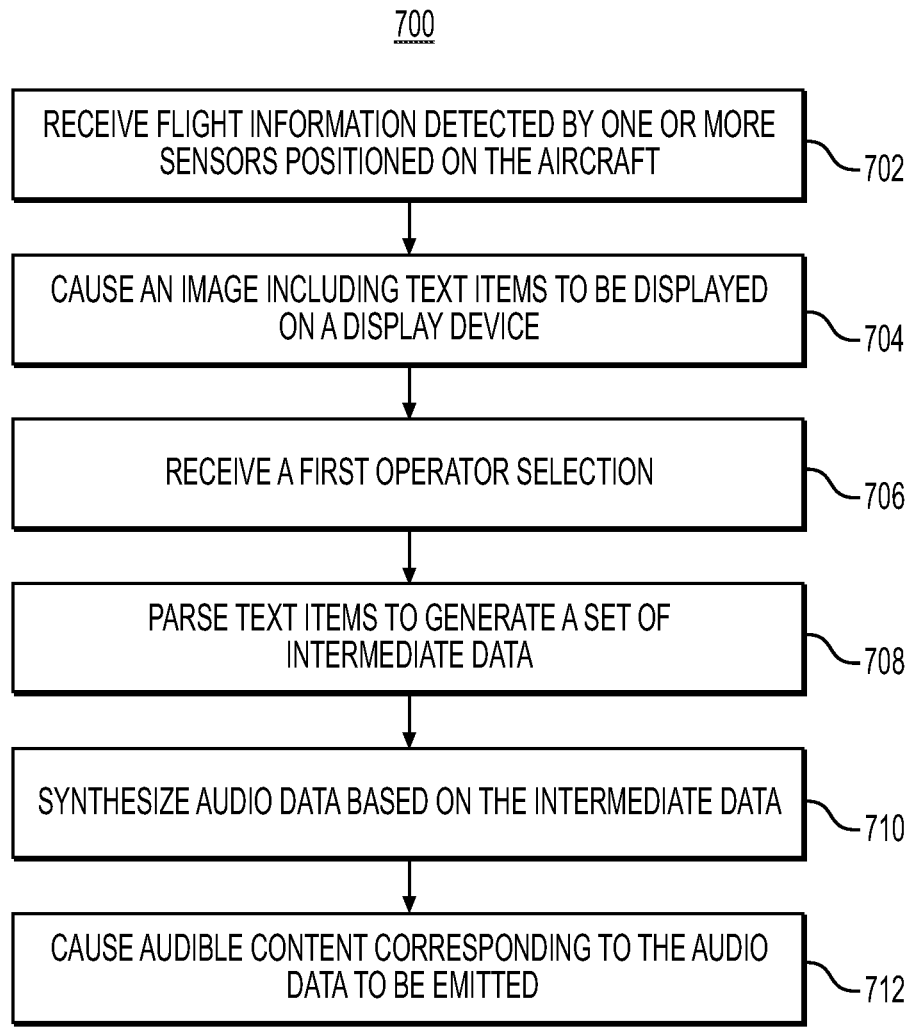
FIG. 7 depicts an exemplary method of providing audible information, according to one or more embodiments.

FIG. 7 depicts an exemplary method 700 of providing audible content to an operator of aircraft 100 according to the disclosure. At step 702, storage device 106 and/or processing module 108 may receive flight information detected by one or more sensors of flight sensor system 112. The flight information may include various measurements such as altitude and cabin pressure, status of onboard systems, navigation information, or any other information.

At step 704, processing module 108 may cause an image including a plurality of text items to be displayed on a display device. The display device may be incorporated in display unit 102. Each of the plurality of text items may correspond to a portion of the flight information received in step 702. The plurality of text items may be displayed in one or more windows, such as CAS window 500 or ENV window 600, as described herein previously.

At step 706, processing module 108 may receive a first operator selection indicative of one or more of the text items displayed on the display device. The first operator selection may be made by an operator of aircraft 100 via user interface 104 and may correspond to one or more text items the operator wishes to be provided audibly. Depending on the operator's preference, the first operator selection may indicate as many as all of the text items displayed by the display device for playback as audible content. The first operator selection may also indicate individual text items for playback or subsets of text items for playback.

At step 708, processing module 108 may parse the one or more text items indicated by the first operator selection. As a result of parsing the one or more text items, processing module 108 may generate a set of intermediate data suitable for audio synthesis. As described herein previously, processing module 108 may parse the one or more text items according to any known technique suitable for generating data suitable for synthesis as audio. In some embodiments, the one or more text items parsed by processing module 108 may include sentiment information associated therewith. The sentiment information may be indicative of an urgency of the information conveyed by each text item. For example, a text item indicative of an altitude of the aircraft 100 may include "emergency" sentiment information when the altitude is below a threshold value. Conversely, a text item indicative of an altitude of the aircraft 100 may include "neutral" sentiment information when the altitude is within a range of expected values. The sentiment information may be included in the intermediate data following parsing for use during audio synthesis. Alternatively, processing module 108 may generate the sentiment information during parsing based on the content of the one or more text items. For example, processing module 108 may be trained or otherwise configured to associate sentiment information with content of the one or more text items.

At step 710, processing module 108 may synthesize audio data based on the intermediate data. Processing module 108 may use a machine learning model to synthesize the audio data based on the intermediate data. For example, the machine learning model may be trained to associate parsed text data (e.g. intermediate data) with audio data. The machine learning model may be trained using one or more sets of parsed text and one or more corresponding sets of audible content including speech and may be trained in a supervised manner, a semi-supervised manner, or an unsupervised manner.

At step 712, processing module 108 may cause audible content corresponding to the audio data to be emitted by one or more components of audio module 116. For example, the audible content may be emitted to one or more speakers in a cockpit of aircraft 100, an audio headset worn by the operator of aircraft 100, or the like. The audible content may include synthetic speech corresponding to the one or more text items selected for playback. Referring back to FIG. 5, if the operator selects the text displayed in CAS window 500 for playback, for example, the audible content may include synthetic speech corresponding to the text items displayed in CAS window 500. The audible content may therefore include synthetically spoken versions of "FMS2-GPS1 Pos Misc," "Check DU 1+2+3+4," "Check Engine Display," "TCAS Fail," "FDR Fail," or any of the other text items shown in FIG. 5.

Each portion of the synthetic speech corresponding to each text item selected for playback may further include an associated sentiment. The associated sentiment for each portion of the synthetic speech may be based on the sentiment information included in the intermediate data. Revisiting the examples described herein previously with reference to step 708, a portion of synthetic speech corresponding to an altitude of the aircraft 100 may have an associated "emergency" sentiment when the altitude is below a threshold value. The "emergency" sentiment may be configured to alert the operator, for example, to dangerous conditions or conditions which otherwise require urgent remediation. Conversely, a portion of synthetic speech corresponding to an altitude of the aircraft 100 may have an associated "neutral" sentiment when the altitude is within a range of expected values. While example sentiments are described herein, the examples provided are not intended to be limiting and any other suitable sentiments may be employed for the speech included in the audible content.

It is to be understood that method 700 need not necessarily be performed in the exact order described herein and the steps described herein may be rearranged in some embodiments. Further, in some embodiments, fewer than all steps of method 700 may be performed and in some embodiments additional steps may be performed.

Systems and methods described herein may allow an operator of an aircraft to select displayed flight information for audible playback. The systems and methods described herein may serve to relieve a pilot's eyes, especially in a single pilot aircraft, when the pilot may be engaged in heavy operations, or when the pilot may become visually impaired. By incorporating speech synthesis, the audible information need not be speaker-dependent and may sound more natural. The audible information may also convey sentiment to the operator for certain information. Further, a range of information that may be conveyed to the operator audibly may be significantly expanded without a need to generate a large library of pre-recorded audio.

Figure 8:
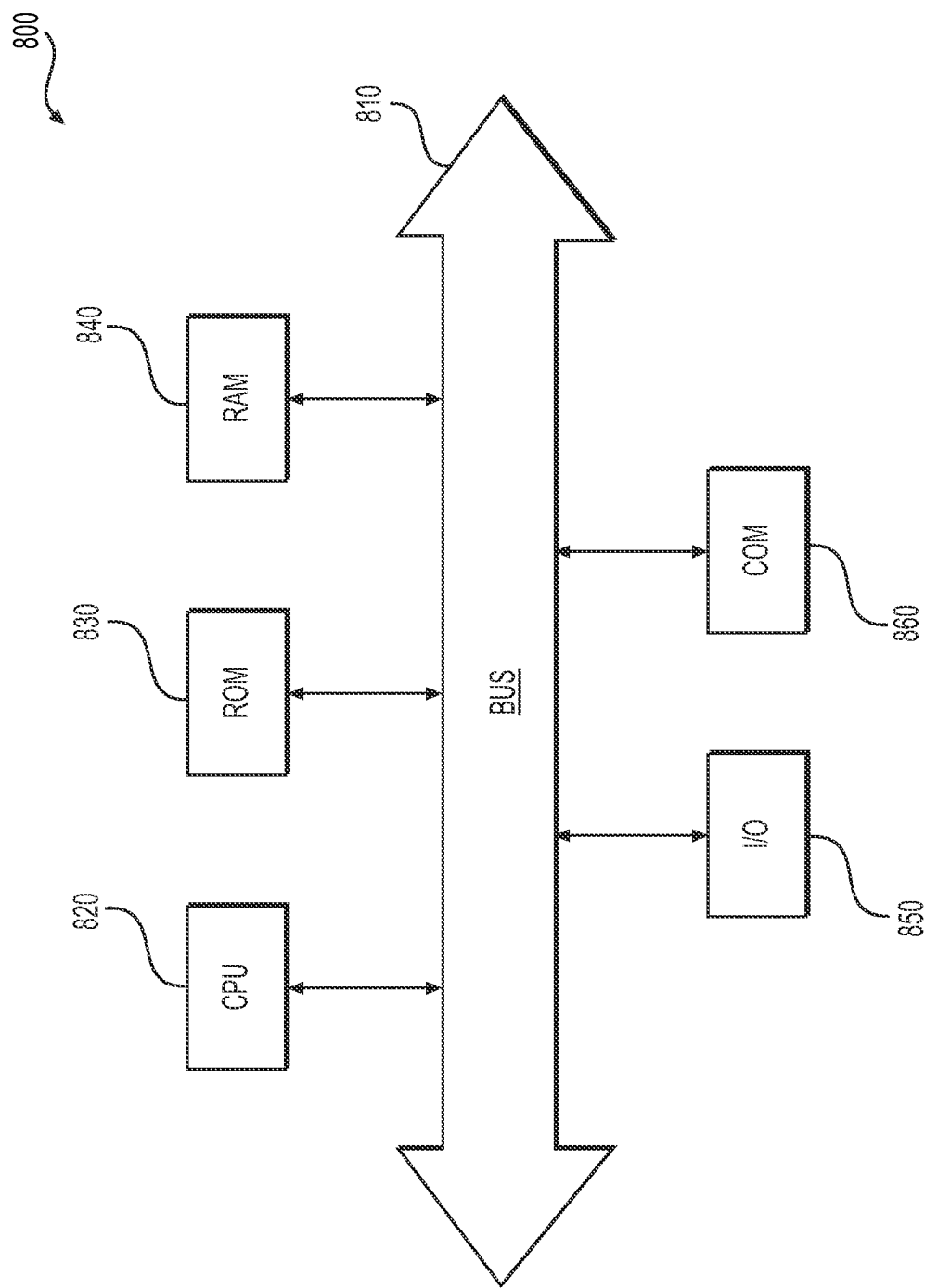
FIG. 8 depicts an example system that may execute techniques presented herein.

FIG. 8 depicts an example system that may execute techniques presented herein. FIG. 8 is a simplified functional block diagram of a computer that may be configured to execute techniques described herein, according to exemplary embodiments of the present disclosure. Specifically, the computer (or "platform" as it may not be a single physical computer infrastructure) may include a data communication interface 860 for packet data communication. The platform may also include a central processing unit ("CPU") 820, in the form of one or more processors, for executing program instructions. The platform may include an internal communication bus 810, and the platform may also include a program storage and/or a data storage for various data files to be processed and/or communicated by the platform such as ROM 830 and RAM 840, although the system 800 may receive programming and data via network communications. The system 800 also may include input and output ports 850 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems and/or methods may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the internet or various other telecommunication networks. Such communications, for example, may enable loading of the software from one computer or processor into another, for example, from a management server or host computer of a mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

As used herein, the term "operator" and variations thereof are intended to refer to any person onboard an aircraft, including pilots and other crew members, and any person otherwise involved with the operation of an aircraft.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the embodiments disclosed herein. It is intended that the specification and examples be considered as exemplary only, with a true scope and spirit of the present disclosure being indicated by the following claims.

What is claimed is:

1. A method of providing audible flight information to an operator of an aircraft, the method comprising:
   receiving, by one or more processors, flight information detected by one or more sensors positioned on the aircraft;
   causing, by the one or more processors, an image to be displayed on a display device, the image including a plurality of text items corresponding to the flight information;
   receiving, by the one or more processors, a first operator selection indicative of one or more of the text items;
   in response to the first operator selection, parsing, by the one or more processors, the one or more text items to generate a set of intermediate data;
   synthesizing, by the one or more processors, audio data based on the intermediate data; and
   causing, by the one or more processors, audible content corresponding to the audio data to be emitted by one or more audio emitting devices, wherein the audible content includes speech corresponding to the flight information.

2. The method of claim 1, wherein the set of intermediate data includes sentiment information for each of the one or more text items, the sentiment information being generated by the one or more processors based on a content of each of the one or more text items.

3. The method of claim 2, wherein each portion of the speech has an associated sentiment, the sentiment corresponding to the sentiment information.

4. The method of claim 1, wherein the image includes a plurality of windows, each of the windows including a subset of the plurality of text items; and
the operator selection is indicative of one or more of the windows.

5. The method of claim 4, wherein the operator selection is indicative of two or more windows; and
the audible content includes speech representative of each subset of the plurality of text items played sequentially.

6. The method of claim 4, further comprising:
causing, by the one or more processors, a status icon to be displayed in at least one of the windows, the status icon being indicative of emission of the audible content.

7. The method of claim 6, further comprising:
receiving, by the one or more processors, a second operator selection indicative of the status icon; and
in response to the second operator selection, causing, by the one or more processors, emission of the audible content to pause.

8. The method of claim 7, further comprising:
receiving, by the one or more processors, a third operator selection indicative of the status icon; and
in response to the third operator selection, causing, by the one or more processors, emission of the audible content to resume.

9. The method of claim 1, wherein the audible content further includes at least one predicate phrase associated with the flight information.

10. The method of claim 1, wherein the synthesizing is performed by the one or more processors using a machine learning model.

11. The method of claim 10, wherein the machine learning model is a neural network trained to associate the intermediate data with audio.

12. The method of claim 1, wherein the parsing is performed by the one or more processors using a machine learning model.

13. The method of claim 12, wherein the machine learning model is a neural network trained to associate text with phonemes.

14. The method of claim 1, further comprising:
receiving, by the one or more processors, a signal indicative of a ground command; and
in response to the signal, pausing, by the one or more processors, the audible content.

15. A method of providing audible flight information to an operator of an aircraft, the method comprising:
receiving, by one or more processors, flight information detected by one or more sensors positioned on the aircraft;
causing, by the one or more processors, an image to be displayed on a display device, the image including a plurality of text items corresponding to the flight information;
parsing, by the one or more processors, the one or more text items to generate a set of intermediate data;
synthesizing, by the one or more processors using a first machine learning model, audio data based on the intermediate data; and
causing, by the one or more processors, audible content corresponding to the audio data to be emitted by one or more audio emitting devices, wherein the audible content includes speech corresponding to the flight information.

16. The method of claim 15, wherein the first machine learning model is a neural network trained to associate the intermediate data with audio.

17. The method of claim 15, wherein the parsing is performed by the one or more processors using a second machine learning model, the second machine learning model being trained to associate text with phonemes.

18. The method of claim 17, wherein the set of intermediate data includes sentiment information for each of the one or more text items, the sentiment information being generated by the one or more processors based on a content of each of the one or more text items.

19. The method of claim 18, wherein the speech has an associated sentiment, the sentiment corresponding to the sentiment information.

20. A system for providing audible flight information to an operator of an aircraft, the system comprising:
one or more memories storing instructions and at least one machine learning model trained to associate text with audio; and
one or more processors operatively connected to the one or more memories, the one or more processors configured to execute the instructions to:
receive flight information detected by one or more sensors;
cause an image to be displayed on a display device, the image including a plurality of text items corresponding to the flight information;
receive an operator selection indicative of one or more of the text items;
parse, using the at least one machine learning model, the one or more text items to generate a set of intermediate data including sentiment information for each of the one or more text items;
synthesize, using the at least one machine learning model, audio data based on the intermediate data; and
cause audible content corresponding to the audio data to be emitted by one or more audio emitting devices, wherein the audible content includes speech representative of each of the one or more text items.

* * * * *